UNITED STATES PATENT OFFICE.

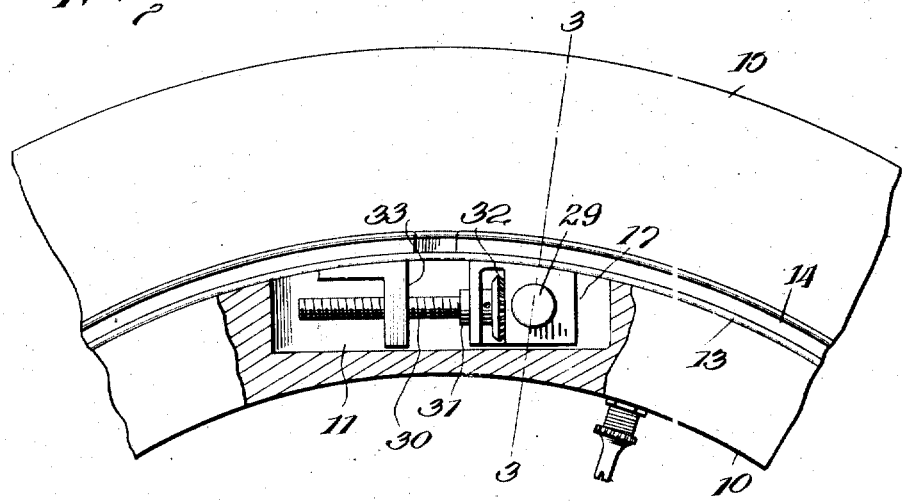
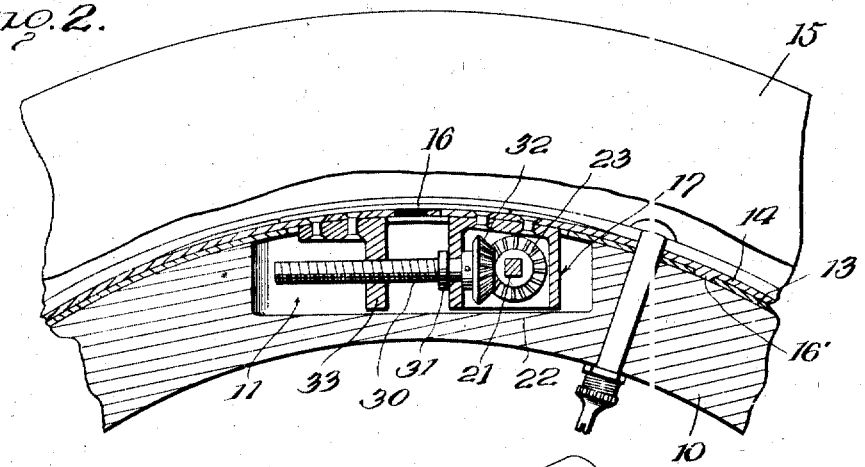
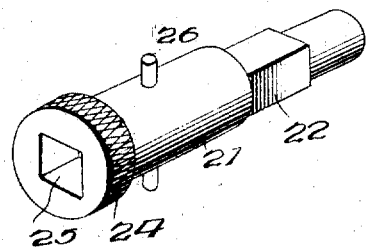

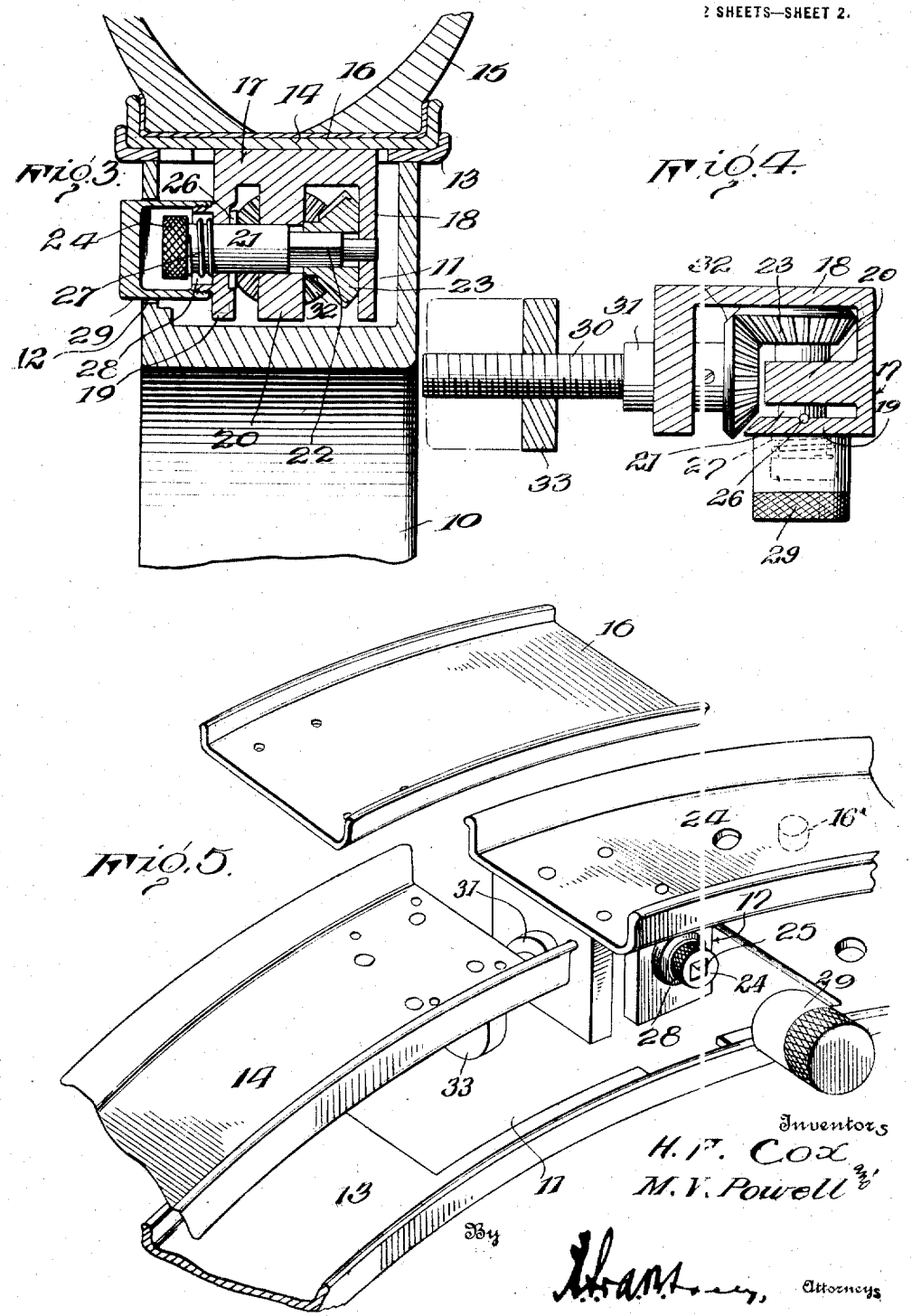

HAROLD F. COX AND MILTON V. POWELL, OF FLINT, MICHIGAN, ASSIGNORS OF ONE-FOURTH TO VICTOR FRANK BROWN, OF BAY CITY, MICHIGAN.

VEHICLE-WHEEL.

1,219,258. Specification of Letters Patent. Patented Mar. 13, 1917.

Application filed May 23, 1916. Serial No. 99,383.

*To all whom it may concern:*

Be it known that we, HAROLD F. COX and MILTON V. POWELL, citizens of the United States, residing at Flint, in the county of Genessee and State of Michigan, have invented certain new and useful Improvements in Vehicle-Wheels, of which the following is a specification.

This invention contemplates an improved vehicle wheel and has as its primary object to provide a construction wherein the wheel will be formed to receive a tire and wherein the said tire may be easily and quickly removed from the wheel.

The invention has as a further object to provide a wheel having a tire carrying rim which may be bodily dismounted from the wheel to effect the displacement of the tire.

A further object of the invention is to provide an improved means for connecting the demountable rim to the wheel and for locking the said rim in active position.

And a still further object of the invention is to provide a construction wherein the tire may be easily attached to or detached from the said demountable rim.

Other and incidental objects will appear as the description proceeds and in the drawings wherein we have illustrated the preferred embodiment of the invention and wherein similar reference characters designate corresponding parts throughout the several views, Figure 1 is a fragmentary side elevation partly in section and particularly illustrating the connection between the free ends of the tire carrying rim.

Fig. 2 is a fragmentary sectional view more particularly showing the mounting and arrangement of the elements of the said connection, Fig. 3 is a transverse sectional view showing the mounting of the said connection within the felly of the wheel, Fig. 4 is a sectional view of the felly detached, Fig. 5 is a fragmentary perspective view showing the manner in which the tire carrying rim is applied to the wheel, and Fig. 6 is a perspective view of the operating shaft for the said connection.

In carrying out the invention, the improved wheel is formed with a felly 10 which is supported by a plurality of spokes in the usual manner. Upon one side of the wheel, the felly 10 is provided with a recess 11 communicating with which is a slot 12 opening through one side of the felly. Surrounding the felly 10 is a fixed channeled rim 13 which may be secured to the felly in any approved manner and, as seen in Fig. 5 of the drawings, the recess 11 opens through this rim.

Arranged to fit snugly within the fixed rim 13 is a demountable tire carrying rim 14 substantially channel shaped in cross-section to receive a tire 15 which may be of any approved type and connected to the rim 14 in some convenient manner with the valve of the tire extending through the felly 10. The rim 14 is preferably formed of some suitable resilient material and is split upon one side thereof. Arranged to close the gap between the free ends of the said rim is a filler plate 16 lying within the channeled portion of the rim beneath the tire 15 and connected to the rim at one end with the free end of the plate slidably overlying the opposite end of the rim. Projecting inwardly from the rim adjacent one end thereof is a stop lug 16' removably received within a suitable recess in the fixed rim 13 for holding the rim 14 against circumferential movement thereon.

Mounted upon the inner side of the rim 14 adjacent one end thereof, is an inwardly directed bracket 17 best seen in Fig. 4 of the drawings. This bracket is formed with spaced side walls 18 and 19 respectively between which projects a web 20 arranged substantially parallel to the said walls and disposed adjacent the wall 19 with the said web supported by the adjacent end wall of the bracket. Journaled in the walls 18 and 19 of the bracket is a transversely extending operating shaft 21 which is freely fitted through the web 20 so that the said shaft may slide longitudinally with respect to the bracket. The shaft 21 adjacent its inner extremity, is formed with a squared portion 22 and slidably mounted thereon to rotate with the shaft, is a beveled pinion 23 interposed between the wall 18 of the bracket and the web 20 thereof. The shaft 21, adjacent its outer extremity, is formed with a milled head 24 in which is formed a socket 25. Extending transversely through the shaft is a locking pin 26 which is arranged to confront the inner face of the wall 19 of the bracket. This wall is, as particularly seen in Fig. 4 of the drawings, formed upon its inner side with oppositely disposed grooves or sockets adapted to receive the free ends of the pin 26 for holding the shaft 21 against rotation. Interposed between the wall 19 of the bracket and the head 24 of the shaft, is a helical spring 27 which surrounds the outer extremity of the shaft and normally acts upon the said shaft to maintain the locking pin 26 engaged within the sockets coacting therewith for locking the shaft against rotation.

Extending outwardly from the wall 19 of the bracket is an annular boss 28 which surrounds the shaft 21 and is externally screw threaded to detachably receive a protecting cap 29 fitting over the outer end of the shaft. As will be seen, this cap 29 is adapted to prevent mud or other foreign matter from clogging the socket 25 and is received through the slot 12 in the felly 10.

Journaled in the outer end wall of the bracket 17 is a clamping bolts or shaft 30 which is formed with a collar 31 abutting the said wall and detachably receives at the adjacent inner end thereof, a beveled pinion 32 meshing with the pinion 23 of the shaft 21. As best shown in Fig. 4 of the drawings, the side wall 19 of the said bracket is cut away to receive the pinion 32 so that it may freely rotate. The shaft 30, adjacent its outer extremity, is screw threaded to engage with an inwardly directed bracket 33 mounted upon the adjacent extremity of the rim 13 opposite the bracket 17 with the said shaft thus adjustably connecting the ends of the rim.

As will now be seen, the cap 29 may be removed and a tool engaged in the socket 25 of the shaft 21 for rotating the shaft and consequently contracting or expanding the rim 13. To effect this result, however, it will be noted that in order to rotate the shaft 21, inward pressure must be exerted upon the said shaft sufficient to overcome the tension of the spring 27 and shift the shaft inwardly to release the locking pin 26. The shaft 21 may then be rotated to turn the shaft 30 and adjust the rim 13. By removing the cap 29 and expanding the rim 13, it may be easily fitted around the wheel to engage within the fixed rim 14 with the brackets 17 and 33 received within the recess 11 of the felly. Then, by properly rotating the shaft 21, the rim 13 may be firmly clamped upon the wheel to be held in position thereon supporting the tire 15 and in this connection, attention is directed to the fact that the pin 26 is adapted to lock the rim in active position upon the wheel and will release the said rim only when the shaft 21 is manually shifted inwardly. A secure mounting for the rim 13 is thus provided.

The rim 13 may, of course, be demounted by simply expanding the said rim to disengage the fixed rim 14, and it will therefore be seen that we provide a simple and efficient arrangement whereby the tire may be easily attached to or detached from the wheel since this result may be readily accomplished by means of the demountable rim 13. Furthermore, in providing an expansible tire carrying rim, the tire itself, may, as will be readily understood, be easily mounted upon the rim or demounted therefrom.

Having thus described our invention, what we claim and desire to secure by Letters Patent is:

1. A wheel including a fixed rim, a demountable tire receiving rim mounted upon the fixed rim to coact therewith, means for adjustably contracting the demountable rim and slidably shiftable to locked position, and means for shifting the said first mentioned means to locked position holding the demountable rim at contracted adjustment.

2. A wheel including a fixed rim, a demountable tire receiving rim contractible upon the fixed rim to coact therewith, a clamping member rotatable for adjustably contracting the demountable rim, means for rotating the said member, and locking means connected to said last mentioned means and shiftable thereby to active position holding the demountable rim at contracted adjustment.

3. A wheel including a fixed rim, a demountable tire receiving rim contractible upon the fixed rim to coact therewith, a slidably shiftable shaft rotatable for adjustably contracting the demountable rim, and means for automatically shifting the said shaft to locked position holding the demountable rim at contracted adjustment.

4. A wheel including a fixed rim, a demountable tire receiving rim contractible upon the fixed rim to coact therewith, and a shaft slidably shiftable from locked position to active position rotatable for contracting the demountable rim.

5. A wheel including a fixed rim, a demountable tire receiving rim contractible upon the fixed rim to coact therewith, a shaft slidably shiftable from locked position to active position rotatable for contracting the demountable rim, and means for urging the shaft to locked position.

6. A wheel including a fixed rim, a demountable tire receiving rim contractible upon the fixed rim to coact therewith, a shaft rotatable for contracting the demountable rim, and a locking pin rotatable with the shaft and normally holding the shaft against rotation.

7. A wheel including a fixed rim, a demountable tire receiving rim contractible upon the fixed rim to coact therewith, a slidably mounted shaft rotatable for contracting the demountable rim, locking means for the shaft, and yieldable means acting to slide the shaft for urging the said locking means to active position holding the shaft against rotation.

8. A wheel including a fixed rim, a demountable tire receiving rim contractible upon the fixed rim to coact therewith, a shaft rotatable for contracting the demountable rim, locking means carried by the shaft, and means engaging the shaft for normally urging the shaft to a position with the said locking means holding the shaft against rotation.

9. A wheel including a fixed rim, a demountable tire receiving rim contractible upon the fixed rim to coact therewith, a longitudinally shiftable shaft rotatable for contracting the demountable rim, locking means carried by the said shaft, and means engaging the shaft and normally acting thereon to shift the shaft longitudinally to a position with the said locking means holding the shaft against rotation.

10. A wheel including a fixed rim, a demountable tire receiving rim mounted thereon and expansible to release the fixed rim, and means for adjustably expanding the demountable rim with the said means slidably shiftable to locked position.

11. A device of the character described including a fixed rim, a demountable tire receiving rim contractible upon the fixed rim to co-act therewith, a bracket carried by the tire receiving rim, an arm carried by said last mentioned rim to confront the bracket, a shaft carried by said bracket and adjustably engaged by said arm, a second shaft slidably and rotatably mounted upon the bracket, and interengaging gears between the said shafts with one of said gears slidable upon said second mentioned shaft and with the said second mentioned shaft rotatable for adjustably contracting the tire receiving rim and slidable to locked position for holding the tire receiving rim at adjustment.

12. A device of the character described including a fixed rim, a demountable tire receiving rim contractible upon the fixed rim to co-act therewith, a bracket upon the tire receiving rim, an arm carried by the tire receiving rim, a shaft rotatably mounted upon the bracket and adjustably engaging said arm, a second shaft slidably and rotatably mounted upon the bracket, the bracket being provided with a socket, interengaging gears between the said shafts with the said second mentioned shaft rotatable for adjustably contracting the tire receiving rim, a locking element carried by the said second mentioned shaft, and yieldable means engaging the said second mentioned shaft for slidably shifting the said shaft to a position with the said element engaging in said socket for holding the tire receiving rim at adjustment.

In testimony whereof we affix our signatures.

HAROLD F. COX. [L. S.]
MILTON V. POWELL. [L. S.]